United States Patent [19]
Stockwell et al.

[11] Patent Number: 5,950,195
[45] Date of Patent: *Sep. 7, 1999

[54] GENERALIZED SECURITY POLICY MANAGEMENT SYSTEM AND METHOD

[75] Inventors: Edward B. Stockwell, St. Paul; Alan E. Klietz, Fridley, both of Minn.

[73] Assignee: Secure Computing Corporation, Roseville, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,668

[22] Filed: Sep. 18, 1996

[51] Int. Cl.⁶ .................................................. G06F 17/30
[52] U.S. Cl. .............................. 707/4; 707/3; 707/100; 707/102; 707/103; 707/104; 707/513
[58] Field of Search ................ 380/25, 23; 395/615, 395/187.01, 206.12; 707/3, 4, 100, 102, 103, 104, 513

[56] References Cited

U.S. PATENT DOCUMENTS

| | | | |
|---|---|---|---|
| 3,956,615 | 5/1976 | Anderson et al. | 380/49 |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |
| 4,584,639 | 4/1986 | Hardy | 364/200 |
| 4,621,321 | 11/1986 | Boebert et al. | 364/200 |
| 4,648,031 | 3/1987 | Jenner et al. | 364/200 |
| 4,701,840 | 10/1987 | Boebert et al. | 364/200 |
| 4,713,753 | 12/1987 | Boebert et al. | 380/4 |
| 4,870,571 | 9/1989 | Frink | 364/200 |
| 4,885,789 | 12/1989 | Burger et al. | 380/25 |
| 4,888,801 | 12/1989 | Foster et al. | 380/21 |
| 4,914,568 | 4/1990 | Kodosky et al. | 364/200 |
| 5,093,914 | 3/1992 | Coplien et al. | 395/700 |
| 5,124,984 | 6/1992 | Engel | 370/94.1 |

(List continued on next page.)

FOREIGN PATENT DOCUMENTS

| | | | |
|---|---|---|---|
| 0 554 182 A1 | 4/1993 | European Pat. Off. | H04L 29/06 |
| 0 743 777 A2 | 11/1996 | European Pat. Off. | H04L 29/06 |
| 96/13113 | 5/1996 | WIPO | H04L 29/06 |
| 96/31035 | 10/1996 | WIPO | H04L 12/24 |
| 97/13340 | 4/1997 | WIPO | H04L 9/00 |
| 97/16911 | 5/1997 | WIPO | H04L 29/06 |
| 97/23972 | 7/1997 | WIPO | H04L 9/00 |
| 97/26731 | 7/1997 | WIPO | H04L 9/00 |
| 97/26734 | 7/1997 | WIPO | H04L 9/00 |
| 97/26735 | 7/1997 | WIPO | H04L 9/00 |
| 97/29413 | 8/1997 | WIPO . | |

OTHER PUBLICATIONS

Hong, Toue, and Leifer, "Personal Electronic Notebook with Sharing", IEEE/IEE Publications, pp. 88–94, Apr. 20, 1995.

Steffen Stempel, "IpAcess—An Internet Service Access System for Firewall Installations", IEEE, pp. 31–41, 1995.

Greenwald, Singhal, Stone, and Cheriton, "Designing an Academic Firewall: Policy, Practice, and Experience With Surf", pp. 79–92, 1996.

(List continued on next page.)

Primary Examiner—Thomas G. Black
Assistant Examiner—Cheryl Lewis
Attorney, Agent, or Firm—Schwegman, Lundberg, Woessner & Kluth, P.A.

[57] ABSTRACT

A system and method for regulating the flow of internetwork connections through a firewall having a network protocol stack which includes an Internet Protocol (IP) layer. A determination is made of the parameters characteristic of a connection request, including a netelement parameter characteristic of where the connection request came from. A query is generated and a determination is made whether there is a rule corresponding to that query. If there is a rule corresponding to the query, a determination is made whether authentication is required by the rule. If authentication is required by the rule, an authentication protocol is activated and the connection is activated if the authentication protocol is completed successfully.

19 Claims, 5 Drawing Sheets

U.S. PATENT DOCUMENTS

| | | |
|---|---|---|
| 5,153,918 | 10/1992 | Tuai .......................................... 380/25 |
| 5,204,961 | 4/1993 | Barlow ..................................... 395/725 |
| 5,228,083 | 7/1993 | Lozowick et al. .......................... 380/9 |
| 5,263,147 | 11/1993 | Francisco et al. ...................... 395/425 |
| 5,272,754 | 12/1993 | Boebert ..................................... 380/25 |
| 5,276,735 | 1/1994 | Boebert et al. ........................... 380/21 |
| 5,303,303 | 4/1994 | White ....................................... 380/49 |
| 5,305,385 | 4/1994 | Schanning et al. ....................... 380/25 |
| 5,311,593 | 5/1994 | Carmi ...................................... 380/23 |
| 5,329,623 | 7/1994 | Smith et al. ............................. 395/275 |
| 5,333,266 | 7/1994 | Boaz et al. .............................. 395/200 |
| 5,355,474 | 10/1994 | Thuraisngham et al. ............... 395/600 |
| 5,414,833 | 5/1995 | Hershey et al. ......................... 395/575 |
| 5,416,842 | 5/1995 | Aziz ........................................ 380/30 |
| 5,485,460 | 1/1996 | Schrier et al. ......................... 370/94.1 |
| 5,511,122 | 4/1996 | Atkinson ................................. 380/25 |
| 5,530,758 | 6/1996 | Marino, Jr. et al. ...................... 380/49 |
| 5,548,646 | 8/1996 | Aziz et al. ............................... 380/23 |
| 5,550,984 | 8/1996 | Gelb .................................... 395/200.17 |
| 5,566,170 | 10/1996 | Bakke et al. ............................. 370/60 |
| 5,583,940 | 12/1996 | Vidrascu et al. .......................... 380/49 |
| 5,586,260 | 12/1996 | Hu ......................................... 395/200.2 |
| 5,604,490 | 2/1997 | Blakley, III et al. ............. 340/825.31 |
| 5,606,668 | 2/1997 | Shwed ................................. 395/200.11 |
| 5,615,340 | 3/1997 | Dai et al. ............................ 395/200.17 |
| 5,619,648 | 4/1997 | Canale et al. ....................... 395/200.01 |
| 5,623,601 | 4/1997 | Vu ...................................... 395/187.01 |
| 5,636,371 | 6/1997 | Yu ........................................... 395/500 |
| 5,644,571 | 7/1997 | Seaman ................................... 370/401 |
| 5,671,279 | 9/1997 | Elgamal .................................. 380/23 |
| 5,673,322 | 9/1997 | Pepe et al. ............................... 380/49 |
| 5,684,951 | 11/1997 | Goldman et al. .................. 395/188.01 |
| 5,689,566 | 11/1997 | Nguyen ..................................... 380/25 |
| 5,699,513 | 12/1997 | Feigen et al. ....................... 395/187.01 |
| 5,706,507 | 1/1998 | Schloss .................................... 395/615 |
| 5,708,780 | 1/1998 | Levergood et al. ............... 395/200.12 |
| 5,720,035 | 2/1998 | Allegre et al. ..................... 395/200.06 |
| 5,724,425 | 3/1998 | Chang et al. ............................. 380/25 |
| 5,781,550 | 7/1998 | Templin et al. ......................... 370/401 |

OTHER PUBLICATIONS

Bill Gassman, "Internet Security, and Firewalls Protection on the Internet", IEEE, pp. 93–107, 1996.

S. Cobb, "Establishing fiewall policy", IEEE, pp. 198–205, 1996.

Steven M. Bellovin and William R. Cheswick, "Network Firewalls", IEEE, pp. 50–57, Sep. 1994.

Lee J. White and Hareton K.N. Leung, "A Firewall Concept for both Control–Flow and Data–Flow in Regression Integration Testing", IEEE, pp. 262–271, 1992.

"100% of Hackers Failed to Break Into One Internet Site Protected by Sidewinder", News Release, Secure Computing Corporation, (Feb. 16, 1995).

"Internet Security System Given 'Product of the Year' Award", News Release, Secure Computing Corporation (Mar. 28, 1995).

"Satan No Threat to Sidewinder™", News Release, Secure Computing Corporation (Apr. 26, 1995).

"Answers to Frequently Asked Questions About Network Security", Secure Computing Corporation, 41 p. (1994).

Adam, J.A., "Meta–matrices", *IEEE Spectrum*, 26–27 (Oct. 1992).

Adam, J.A., "Playing on the Net", *IEEE Spectrum*, 29 (Oct. 1992).

Ancilotti, P., et al., "Language Features for Access Control", *IEEE Transactions on Software Engineering*, SE–9, 16–25 (Jan. 1983).

Badger, L., et al., "Practical Domain and Type Enforcement for UNIX", *Proceedings of the 1995 IEEE Symposium on Security and Privacy*, Oakland, CA, 66–77 (May 8–10, 1995).

Belkin, N.J., et al., "Information Filtering and Information Retrieval: Two Sides of the Same Coin?", *Communications of the ACM*, 35, 29–28 (Dec. 1992).

Bellovin, S.M., et al., "Network Firewalls", *IEEE Communications Magazine*, 32, 50–57 (Sep. 1994).

Bevier, W.R., et al., "Connection Policies and Controlled Interference", *Proceedings of the 8th IEEE Computer Security Foundations Workshop*, Kenmare, County Kelly, Ireland, 167–176 (Jun. 13–15, 1995).

Bowen, T.F., et al., "The Datacycle Architecture", *Communications of the ACM*, 35, 71–81 (Dec. 1992).

Bryan, J., "Firewalls For Sale", *BYTE*, pp. 99–100, 102 and 104 (Apr. 1995).

Damashek, M., "Gauging Similarity with n–Grams: Language–Independent Categorization of Text", *Science*, 267, 843–848 (Feb. 10, 1995).

Dillaway, B.B., et al., "A Practical Design for A Multilevel Secure Database Management System", *American Institute of Aeronautics and Astronautics, Inc.*, pp. 44–57 (Dec. 1986).

Fine, T., et al., "Assuring Distributed Trusted Mach", *Proceedings of the 1993 IEEE Computer Society Symposium on Research in Security and Privacy*, 206–218 (1993).

Foltz, P.W., et al., "Personalized Information Delivery: An Analysis of Information Filtering Methods", *Communications of the ACM*, 35, 51–60 (Dec. 1992).

Goldberg, D., et al., "Using Collaborative Filtering to Weave an Information Tapestry", *Communications of the ACM*, 35, 61–70 (Dec. 1992).

Grampp, F.T., "UNIX Operating System Security", *AT&T Bell Laboratories Technical Journal*, 63, 1649–1672 (Oct. 1984).

Haigh, J.T., et al., "Extending the Non–Interference Version of MLS for SAT", *Proceedings of the 1986 IEEE Symposium on Security and Privacy*, Oakland, CA, 232–239 (Apr. 7–9, 1986).

Kent, S.T., "Internet Privacy Enhanced Mail", *Communications of the ACM*, 36, 48–60 (Apr. 1993).

Lampson, B.W., "Dynamic Protection Structures", *AFIPS Conference Proceedings*, vol. 35, 1969 Fall Joint Computer Conference, Las Vegas, NV, 27–38 (Nov. 18–20, 1969).

Lee, K.–C., et al., "A Framework for Controlling Cooperative Agents", *Computer*, 8–16 (Jul. 1993).

Loeb, S., "Architecting Personalized Delivery of Multimedia Information", *Communications of the ACM*, 35, 39–50 (Dec. 1992).

Loeb, S., et al., "Information Filtering," *Communications of the ACM*, 35, 26–28 (Dec. 1992).

Merenbloom, P., "Network 'Fire Walls' Safeguard LAN Data from Outside Intrusion", *InfoWorld*, p. 69 (Jul. 25, 1994).

Obraczka, K., et al., "Internet Resource Discovery Services", *Computer*, 26, 8–22 (Sep. 1993).

Press, L., "The Net: Progress and Opportunity", *Communications of the ACM*, 35, 21–25 (Dec. 1992).

Schroeder, M.D., et al., "A Hardware Architecture for Implementing Protection Rings", *Communications of the ACM*, 15, 157–170 (Mar. 1972).

Schwartz, M.F., "Internet Resource Discovery at the University of Colorado", *Computer*, 26, 25–35 (Sep. 1993).

Smith, R.E., "Sidewinder: Defense in Depth Using Type Enforcement", *International Journal of Network Management,* 219–229, (Jul.–Aug. 1995).

Thomsen, D., "Type Enforcement: The New Security Model", *Proceedings of the SPIE, Multimedia: Full–Service Impact on Business, Education and the Home,* vol. 2617, Philadelphia, PA, 143–150 (Oct. 23–24, 1995).

Warrier, U.S., et al., "A Platform for Heterogeneous Interconnection Network Management", *IEEE Journal on Selected Areas in Communications,* 8, 119–126 (Jan. 1990).

Wolfe, A, "Honeywell Builds Hardware for Computer Security", *Electronics,* 14–15 (Sep. 2, 1985).

International Search Report , PCT Application No. PCT/US 95/12681, 8 p. (mailed Apr. 9, 1996).

"Sidewinder Internals", Product information, Securing Computing Corporation, 16 p. (Oct. 1994).

"Special Report: Secure Computing Corporation and Network Security", *Computer Select,* 13 p. (Dec. 1995).

Atkinson, R., "IP Authentication Header", Network Working Group, Request For Comment No. 1826, http//ds.internic.net/rfc/rfc1826.txt, 9 p. (Aug. 1995).

Atkinson, R., "IP Encapsulating Security Payload (ESP)", Network Working Group, Request For Comment No. 1827, http//ds.internic.net/rfc/rfc1827.txt, 12 p. (Aug. 1995).

Atkinson, R., "Security Architecture for the Internet Protocol", Network Working Group, Reqest for Comment No. 1825, http//ds.internic.net/rfc/rfc1825.txt, 21 p. (Aug. 1995).

Baclace, P.E., "Competitive Agents for Information Filtering", *Communications of the ACM,* 35, 50 (Dec. 1992).

Karn, P., et al., "The ESP DES–CBC Transform", Network Working Group, Request for Comment No. 1829, http//ds.internic.net/rfc/rfc1829.txt, 9 p. (Aug. 1995).

McCarthy, S.P., "Hey Hackers! Secure Computing Says You Can't Break into This Telnet Site", *Computer Select,* 2 p. (Dec. 1995).

Metzger, P., et al., "IP Authentication using Keyed MD5", Network Working Group, Request for Comments No. 1828, http//ds.internic.net/rfc/rfc1828.txt, 5 p. (Aug. 1995).

Peterson, L.L., et al., In: *Computer Networks,* Morgan Kaufmann Publishers, Inc., San Francisco, CA, pp. 218–221, 284–286 (1996).

Smith, R.E., "Constructing a High Assurance Mail Guard", *Proceedings of the 17th Annual National Computer Security Conference,* pp. 247–253 )Oct. 1994).

Stadnyk, I., et al., "Modeling User's Interests in Information Filters", *Communications of the ACM,* 35, 49–50 (Dec. 1992).

Stevens, C., "Automating the Creation of Information Filters", *Communications of the AMC,* 35, 48 (Dec. 1992).

|  | PARAMETER NAMES | MATCH CRITERIA | ACTION | SIDE EFFECTS |
|---|---|---|---|---|
| RULE[1] | PARM[1...M] | VAL[1...M] |  |  |
| RULE[2] | PARM[1...M] | VAL[1...M] |  |  |
| . . . |  |  |  |  |
| RULE[N] | PARM[1...M] | VAL[1...M] |  |  |

*FIG. 5*

GENERALIZED SECURITY POLICY MANAGEMENT SYSTEM AND METHOD

BACKGROUND OF THE INVENTION

1. Field of the Invention

The present invention pertains generally to network communications, and in particular to a system and method for regulating the flow of internetwork connections through a firewall.

2. Background Information

Firewalls have become an increasingly important part of network design. Firewalls provide protection of valuable resources on a private network while allowing communication and access with systems located on an unprotected network such as the Internet. In addition, they operate to block attacks on a private network arriving from the unprotected network by providing a single connection with limited services. A well designed firewall limits the security problems of an Internet connection to a single firewall computer system. This allows an organization to focus their network security efforts on the definition of the security policy enforced by the firewall. An example of a firewall is given in "SYSTEM AND METHOD FOR PROVIDING SECURE INTERNETWORK SERVICES", U.S. patent application Ser. No. 08/322078, filed Oct. 12, 1994 by Boebert et al., allowed, the description of which is hereby incorporated by reference. A second example of such a system is described in "SYSTEM AND METHOD FOR ACHIEVING NETWORK SEPARATION", U.S. application Ser. No. 08/599,232, filed Feb. 9, 1996 by Gooderum et al., pending, the description of which is hereby incorporated by reference. Both are examples of application level gateways. Application level gateways use proxies operating at the application layer to process traffic through the firewall. As such, they can review not only the message traffic but also message content. In addition, they provide authentication and identification services, access control and auditing.

Access Control Lists, or ACLs, are lists of rules that regulate the flow of Internet connections through a firewall. These rules control how a firewall's servers and proxies will react to connection attempts. When a server or proxy receives an incoming connection, it performs an ACL check on that connection.

An ACL check compares the source and destination IP address of the connection against a list of ACL rules. The rules determine whether the connection is allowed or denied. A rule can also have one or more side effects. A side effect causes the proxy to change its behavior in some fashion. For example, a common side effect is to redirect the destination IP address to an alternate machine.

Sidewinder, Version 2.0, is a firewall which is an example of a system which uses an ACL check to regulate the flow of Internet connections through its firewall. ACLs in Sidewinder 2.0 are stored in a file, /etc/sidewinder/acl.conf. The file is read by all of the servers and proxies on the Sidewinder firewall. A line in the file either allows or denies a connection based on the connections source IP address, destination IP address, and destination port number. Some examples are shown below:

```
allowed_flow( source_addr(net_addr(*.*.*.* 0 internal))
              dest_addr(net_addr(*.*.*.* 0 external))
              service (ftp tcp)
              0.0.0.0 0)
```

This rule allows access from any client located in the internal security domain to any ftp server located in the external security domain.

```
allowed_flow( source_addr(net_addr(*.*.*.* 0 internal))
              dest_addr(net_addr(*.*.*.* 0 external))
              service (http tcp)
              0.0.0.0 0)
denied_flow( source_addr(net_addr(*.*.*.* 0 internal))
             dest_addr(net_addr=(174.252.1.1 0 external))
             service(http tcp)
             0.0.0.0 0)
```

The first rule allows http access from the internal security domain to all Web servers in the external security domain. The second rule denies access to a specific web server located at 174.252.1.1.

```
allowed_flow( source_addr(net_addr(*.*.*.* 0 external))
              dest_addr(net_addr(192.168.1.192 0 external))
              service(nntp tcp)
              172.17.192.48 0)
```

This rule intercepts all incoming connections that go the external side of the local Sidewinder (192.168.1.192) and redirects them to shade.sctc.com (172.17.192.48).

In general, ACL rules used in Sidewinder, Version 2.0, have the following matching criteria:

- The source IP address. This can be expressed as a subnet by indicating the number of significant bits in the address.
- The source security domain. This is always either "internal" or "external".
- The destination IP address.
- The destination security domain, again either "internal" or "external".
- The service name. The names and protocols of the services are obtained from the file /etc/services. and they have the following two side effects:
- Redirect the IP address to a different machine.
- Redirect the port number to a different port.

A connection from a specific IP source address to a specific IP destination address is denied unless there is a rule that allows the connection and there is no entry that denies the connection. The order of entries in the list does not matter.

An ACL approach like that used in Sidewinder 2.0 has a number of limitations. For instance, since all ACL rules in that firewall system are specified using only IP addresses, there is no way to specify a host name. A rule can have only one source, one destination and one service; a separate rule is needed for each service and for each workstation. Therefore, to block access to several web sites you need to create a separate rule for each one. Furthermore, a site with five services and 1,000 workstations may need 5,000 rules. This can slow performance.

In addition, the use of static IP addresses creates a problem for a site that uses Microsoft Windows NT Server and DHCP (Dynamic Host Configuration Protocol) with desktop personal computers (PCS). The DHCP server assigns an arbitrary IP address from a pool when each PC boots up. It is impossible to assign an ACL rule to a particular PC because its IP address is not fixed.

In addition, there is no place to store a user name. The granularity of access control is on a per-host basis.

Sidewinder 2.0 stores a complete copy of the full access control list in the memory of every proxy. If the number of rules is large, the memory consumed hurts performance. In addition, there is no support for activating rules during certain times of the day or during certain days of the week.

Finally, there is no way to specify a different authentication method for a given connection. For a given service, the authentication method must be the same for all users and for all hosts.

What is needed is a generalized security policy management system which can operate free of these limitations.

SUMMARY OF THE INVENTION

The present invention is a system and method for regulating the flow of internetwork connections through a firewall having a network protocol stack which includes an Internet Protocol (IP) layer. A determination is made of the parameters characteristic of a connection request, including a netelement parameter characteristic of where the connection request came from. A query is generated and a determination is made whether there is a rule corresponding to that query. If there is a rule corresponding to the query, a determination is made whether authentication is required by the rule. If authentication is required by the rule, an authentication protocol is activated and the connection is activated if the authentication protocol is completed successfully.

According to another aspect of the present invention, a system and method of regulating the flow of internetwork connections through a firewall having a network protocol stack which includes an Internet Protocol (IP) layer. An access control list is formed, wherein the access control list includes a plurality of rules, where each rule includes a plurality of rule parameters and values associated with said rule parameters. Query parameters characteristic of a connection request are determined, wherein said query parameters include a netelement parameter characteristic of where the connection request came from and a query is generated which lists the query parameters. The query is then applied to the access control list and a determination is made as to whether there is a rule corresponding to the query. If there is a rule, a determination is made as to whether authentication is required by the rule and, if authentication is required by the rule, an authentication protocol is executed. If the authentication protocol is completed successfully, the connection is activated.

According to yet another aspect of the invention, a network-separated application level gateway firewall is described.

BRIEF DESCRIPTION OF THE DRAWINGS

In the drawings, where like numerals refer to like components throughout the several views.

DESCRIPTION OF THE PREFERRED EMBODIMENTS

In the following detailed description of the preferred embodiment, references made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical, physical, architectural, and electrical changes may be made without departing from the spirit and scope of the present invention. The following detailed description is, therefore, not to be taken in a limiting sense, and the scope of the present invention is defined only by the appended claims and their equivalents.

Figure 1:
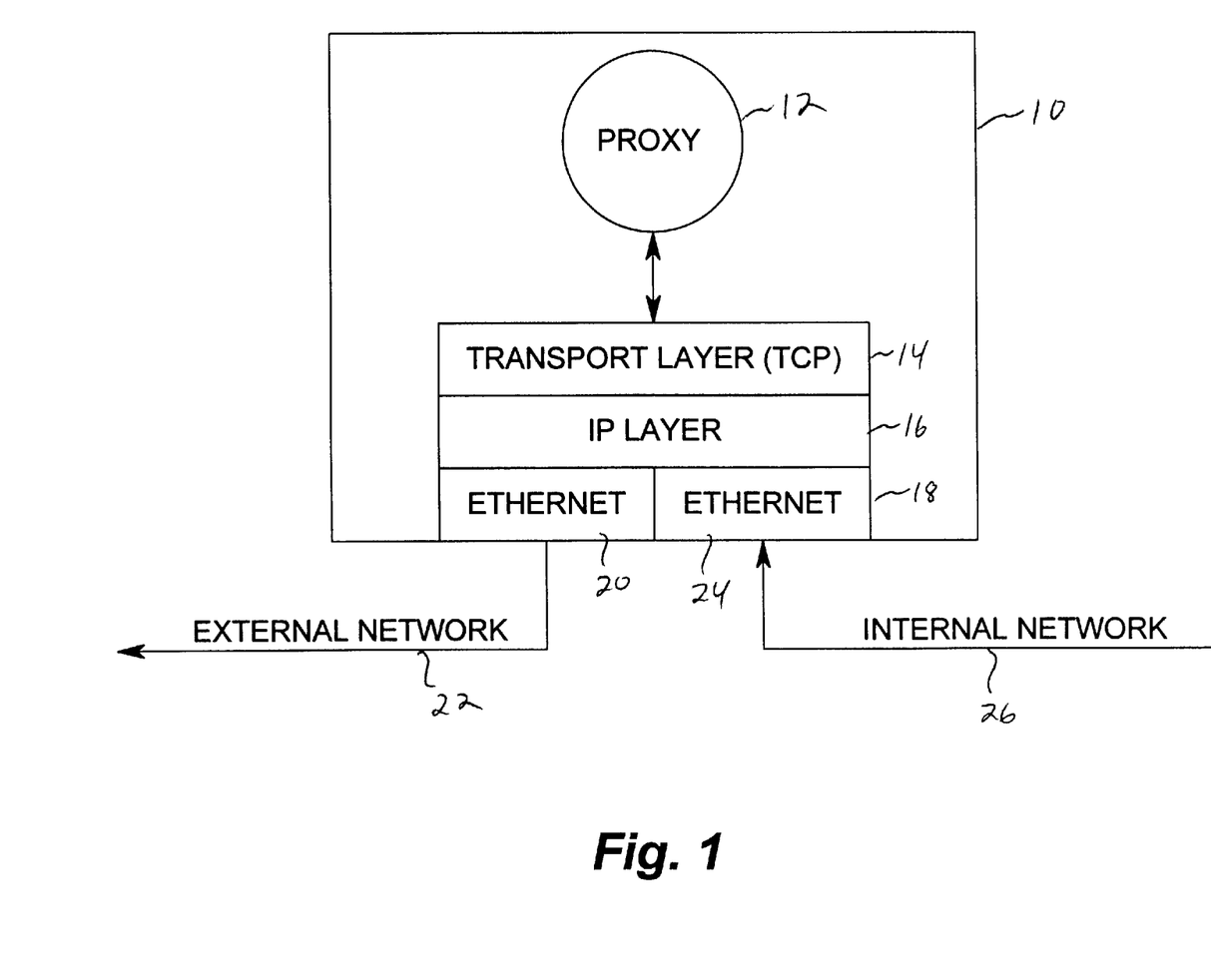
FIG. 1 is a functional block diagram of an application level gateway firewall according to the present invention.

A system 10 which can be used for firewall-to-firewall encryption (FFE) is shown in FIG. 1. In FIG. 1, system 10 includes a workstation 12 communicating through a firewall 14 to an unprotected network 16 such as the Internet. System 10 also includes a workstation 20 communicating through a firewall 18 to unprotected network 16. In one embodiment, firewall 18 is an application level gateway.

A firewall which can be used to regulate the flow of internetwork connections from an internal to an external network is shown in FIG. 1. Firewall 10 is an application level gateway. As noted above, application level gateways use proxies 12 operating at the application layer to process traffic through the firewall. As such, they can review not only the message traffic but also message content. In addition, they provide authentication and identification services, access control and auditing. As can be seen in FIG. 1, proxy 12 is connected through transport layer 14 and Internet Protocol (IP) layer 16 to a physical layer 18. Physical layer 18 includes an Ethernet connection 20 to an external network 22 and an Ethernet connection 24 to an internal network 26.

Figure 2:
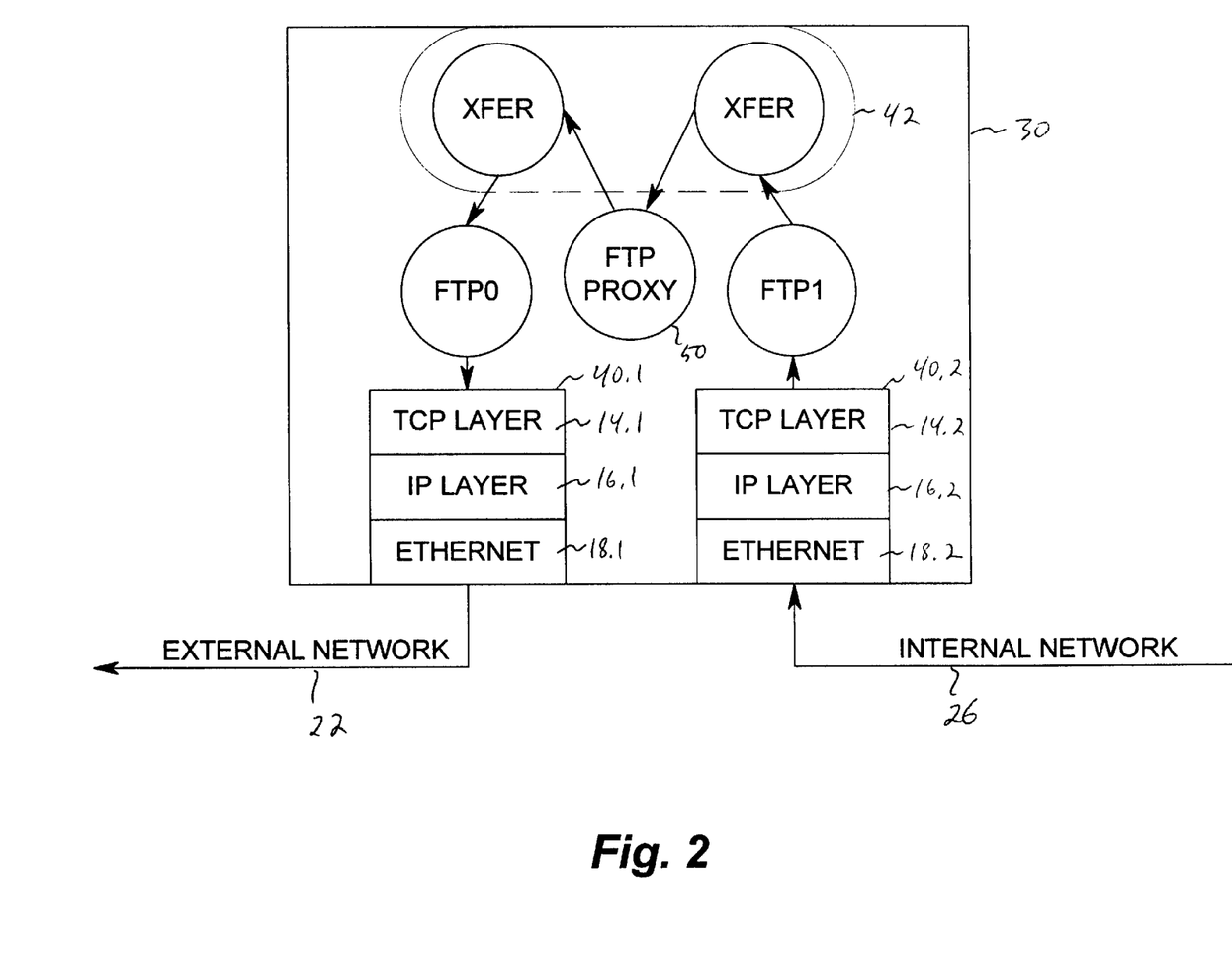
FIG. 2 is a functional block diagram of a network-separated application level gateway firewall according to the present invention.

A network separation version of a firewall is shown in FIG. 2. In FIG. 2, network separation is used to divide firewall 30 into a set of two independent regions or burbs, with a domain and a protocol stack assigned to each burb. Each protocol stack 40 has its own independent set of data structures, including routing information and protocol information. A given socket will be bound to a single protocol stack at creation time and no data can pass between protocol stacks 40 without going through proxy space 42. A proxy 50 therefore acts as the go-between for transfers between domains. Because of this, a malicious attacker who gains control of one of the regions is prevented from being able to compromise processes executing in other regions.

Network separation and its application to an application level gateway is described in "SYSTEM AND METHOD FOR ACHIEVING NETWORK SEPARATION", U.S. application Ser. No. 08/599,232, filed Feb. 9, 1996 by Gooderum et al., pending, the description of which is hereby incorporated by reference. Network separation does provide some significant advantages in implementing an access control scheme. For instance, a school may want to put student machines behind an outer Internet firewall and put the teacher machines behind an inner firewall (in order to protect the teachers' machines from the students, e.g., so that the students don't tamper the teachers' grading files). One solution is to install two firewall systems. A cheaper solution is to provide a single firewall 30 that has three burbs: "external", "student" and "teacher", with ACLs that restrict flow from the outer rings to the inner rings. In other words, multiple burbs allow nested levels of protection without the expense of acquiring additional firewalls.

Furthermore, encryption can be used with network separation to multiplex burbs on a single physical layer interface 24. For example, two burbs could be assigned to a single Ethernet interface card. Each burb has its own network protocol stack; each stack, however, is connected to the same interface card. By encrypting one channel, leaving the other channel unencrypted and including in the ACL information as to whether a particular message is encrypted or unencrypted, it is possible for both burbs to use the same Ethernet card.

As noted above, an Access Control List, or ACL, is a list of rules that regulate the flow of Internet connections through a firewall. These rules control how a firewall's servers and proxies will react to connection attempts. When a server or proxy receives an incoming connection, it performs an ACL check on that connection.

An ACL check compares a set of parameters associated with the connection against a list of ACL rules. The rules determine whether the connection is allowed or denied. A rule can also have one or more side effects. A side effect causes the proxy to change its behavior in some fashion. For example, a common side effect is to redirect the destination IP address to an alternate machine. In addition to IP connection attempts, ACL checks can also made on the console logins and on logins made from serial ports. Finally, ACL checks can also be made on behalf of IP access devices, such as a Cisco box, through the use of the industry standard TACACS+ protocol.

In one embodiment, the ACL is managed by an acld daemon running in the kernel of firewalls 10 and 30. The acld daemon receives two types of requests, one to query the ACL and one to administer it. In one such embodiment, the ACL is stored in a relational database such as the Oracle database for fast access. By using such a database, query execution is asynchronous and many queries can be executing concurrently. In addition, these types of databases are designed to manipulate long lists of rules quickly and efficiently. These qualities ensure that a given query cannot hang up the process that issued the query for any appreciable time (>1–2 seconds).

The current database can hold up to 100,000 users and up to 10,000 hosts but can be scaled up to the capacity of the underlying database engine. The results of an ACL check is cached, allowing repeated checks to be turned around very quickly.

Figure 3:
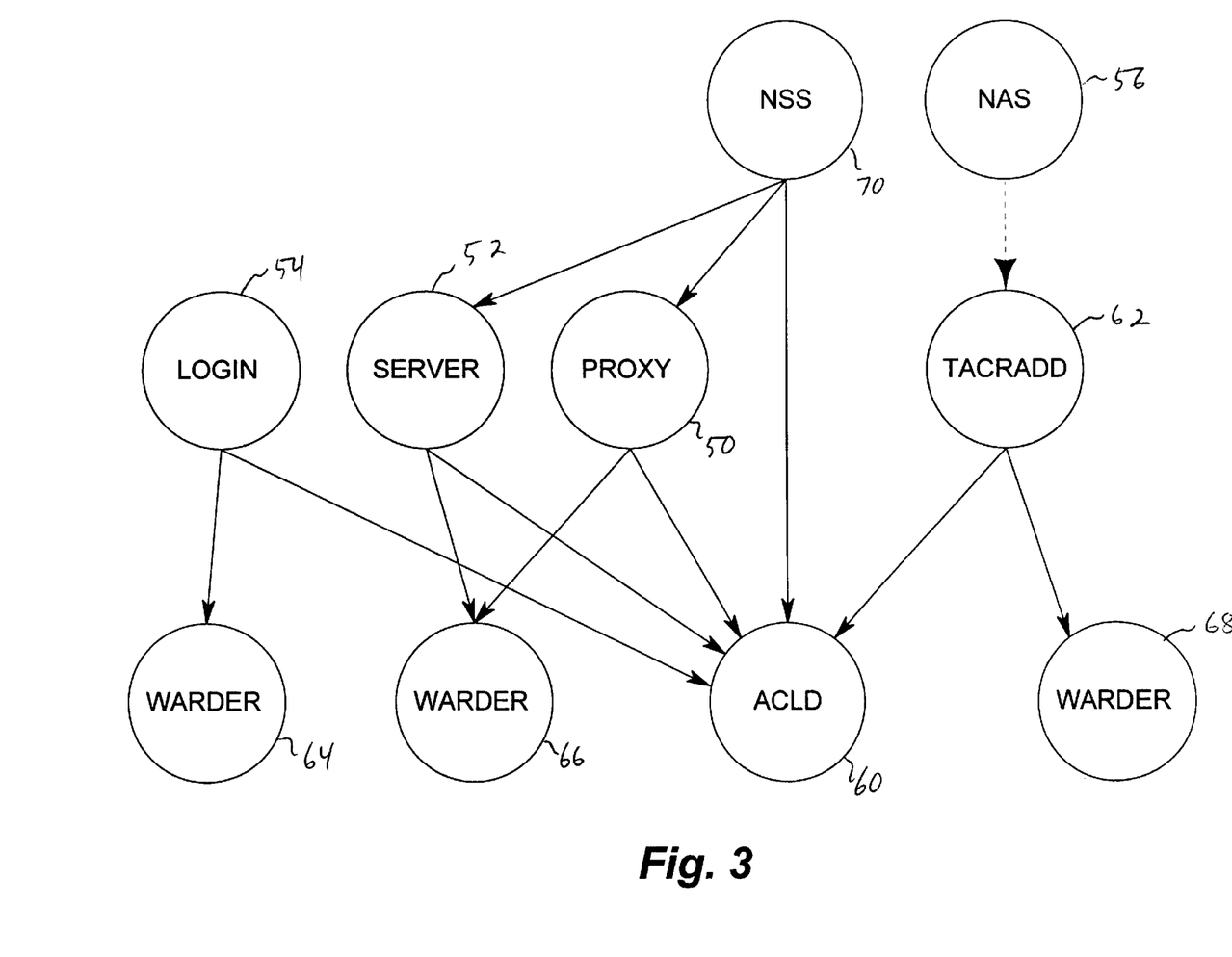
FIG. 3 is a block diagram representing the interaction of agents with warders and with the access control list daemon.

Applications on firewalls 10 and 30 can query acld to determine if a given connection attempt should be allowed to succeed. In one embodiment, such as is shown in FIG. 3, the types of applications (i.e. "agents") that can make ACL queries can be divided into four classes:

1) Proxies 50. These allow connections to pass through firewall 10 or 30 in order to provide access to a remote service. They include tnauthp (authenticated telnet proxy), pftp (FTP proxy), httpp (HTTP proxy), and tcpgsp (TCP generic service proxy).
2) Servers 52. These provide a service on the firewall itself. They include ftpd and httpd.
3) Login agents 54. Login agent 54 is a program on the firewall that can create a Unix shell. It is not considered a server because it cannot receive IP connections. One example is /usr/bin/login when used to create a dialup session or a console session on firewall 10 or 30. Another example is the command srole.
4) Network Access Servers (NAS) 56. NAS 56 is a remote IP access device, typically a dialup box manufactured by such companies as Cisco or Bridge. The NAS usually provides dialup telnet service and may also provide SLIP or PPP service.

Proxies 50, servers 52, login agents 54, and NASes 58 make queries to acld 60 to determine if a given connection attempt should be allowed to succeed. All of the agents except NAS 58 make their queries directly. NAS 58, because it is remote, must communicate via an auxiliary daemon that typically uses an industry standard protocol such as RADIUS or TACACS+. The auxiliary daemon (e.g., tacradd 62) in turn forwards the query to local acld 60.

As a side effect of the query, acld 60 tells the agent if authentication is needed. If no authentication is needed, the connection proceeds immediately. Otherwise acld 60 provides (as another side effect) a list of allowed authentication methods that the user can choose from. The agent can present a menu of choices or simply pick the first authentication method by default. Typical authentication methods include plain password, SNK DSS, SDI SecurID, LOCKout DES, and LOCKout FORTEZZA. In one embodiment, the list of allowed authentication methods varies depending on the host name, user name, time of day, or any combination thereof.

In the embodiment shown in FIG. 3 authentication is actually performed by a special server called a warder. The agent contacts the warder to perform authentication. In one embodiment, a warder is associated with each authentication method. For instance, warder 64 may be the SNK DSS warder, warder 66 may be the LOCKout DES warder and warder 68 may be the LOCKout FORTEZZA warder. A warder is a process which performs an authentication method. In one embodiment, all warders have a common, standard, authentications interface used to talk to the agents. By using this warder structure, a single agent can therefore access any of the available authentication methods simply by contacting the appropriate warder. There is no direct communication between the warder and acld.

A representative proxy agent 50 is described in VIRTUAL PRIVATE NETWORK ON APPLICATION GATEWAY, U.S. patent application Ser. No. 08/715,343, filed herewith, the description of which is hereby incorporated by reference.

The system administrator is responsible for creating the ACL ruleset. The ACL ruleset is a reflection of the administrator's security policy. The administrator needs to answer the following questions before creating the ruleset:
1) Where are the boundaries of the security domains?
2) Which security domains should be allowed to initiate connections into other security domains?
3) What types of information should be allowed to flow between the security domains?
4) Should connections be allowed based on host name, user name, time of day, or some combination thereof?
5) What type(s) of user authentication, if any, should be required to enter a security domain?

In the preferred embodiment, the ACL ruleset can be modified by the administrator using either a graphical user interface, or GUI, or a command line interface. Changes to the ACL ruleset are stored in the internal database. To prevent the occurrence of transient states that may violate the security policy, the database is locked during periods in which the administrator is making more than one rule update. (This is especially important when reloading the entire database from diskette or tape.)

In one embodiment, the database is implemented in SQL using either Faircom's C-Tree or Just Logic's SQL Database Manager. In another embodiment, acld 60 is connected to an external client/server commercial SQL database engine, such as Oracle. This will give the customer additional flexibility in administering the ruleset.

In one embodiment non-time-critical portions of the ACL control and administration code is written in Python. Time-critical portions are coded in C.

Generating a Query

To make an ACL check, the agent collects information about the nature of the connection. This information includes the source and destination IP address. The agent places this information into a query list. The query list contains all of the relevant information needed to make the ACL check. The agent then submits the query list to acld 60 and acld 60 searches for a rule that matches the query list and returns a reply list. The reply list includes either "allow" or "deny" to indicate if the connection should be accepted or rejected. Other values in the reply list are side effects that change the behavior of the agent.

In one embodiment the query list contains the following pieces of information:

The source IP address, if applicable.
The destination IP address, if applicable.
The source security domain.
The destination security domain.
The network protocol (TCP or UDP), if applicable.
The type of agent (proxy, server, login, or NAS).
The type of IP encryption used by the connection, if any.
The name of the user (when known).
The name of the user's selected warder (when known).

This information is used by acld 60 to search for a rule that "best" matches the query.

Rule Precedence

In general, rules with specific values for a query parameter are preferred over rules with a wildcard parameter. For example, a rule that says user="alan" is preferred over a rule that says user=* (where * is a wildcard character). Sometimes it is hard, however, to decide which rule is best. For example, one rule may say host="t-bone", user=* while another rule may say host=*, user="alan". Which rule is "best" in this case? The answer is "it depends". The system administrator needs to decide which is more important: hosts or users, and embed the security policy in the ACL accordingly.

In one embodiment, ACL rules are checked in sequential order. The first rule that matches the query is chosen. In one such embodiment, when the administrator creates a new rule, the acld interface suggests a position in the rule set based on a predefined precedence scheme. The position of the rule is the sole criteria for determining whether or not the rule is selected. The administrator can override the suggested position if he or she so desires and the interface will perform a sanity check and warn the administrator if a rule's position is obviously wrong.

For example, assume there are two rules 'deny_all', and 'allow_alan':

| Name: | deny_all | allow_alan |
|---|---|---|
| Position: | 1 | 2 |
| Action: | deny | allow |
| User(s) : | * | alan |

In this example the acld interface would flag a warning that the second rule (allow_alan) will never match a query because the first rule (deny_all) has a wildcard for the user name.

It should be obvious that other precedence schemes could be used, including schemes which place a higher security value on the host rather than the user, and vice versa.

Once a rule is selected, the agent receives a reply list. The reply can allow or deny the connection (if the agent sets a flag a verbose explanation is sent explaining why the connection was allowed or denied. For each rule in the ruleset, the reply returns a string that explains the result of the comparison with the query list. If the rule did (not) match the query, it returns a string that explains why (not).

The reply can demand authentication. If authentication is demanded, the reply includes a list of allowed warders. The agent can present a menu of authentication method choices to the user or may simply pick the first warder as the default.

The reply can tell the agent to redirect the destination IP address to a different machine. This is only applicable to proxies 50.

The reply can tell the agent to redirect the destination port number to a different port. This is only applicable to proxies 50.

In one embodiment each rule has a name and the reply returns the name of the rule that matched the query. This is useful for troubleshooting problems with the ruleset. In another embodiment the reply returns the position of the rule in the ruleset. Again this is useful for troubleshooting.

The reply can provide additional side effects that are unique to the service. For example, for an FTP service it determines whether GET or PUT operations are allowed. For an HTTP service it determines what types of URLs are blocked by the HTTP proxy.

The reply can include an expiration date for the result of this query. This is used internally for caching. If a duplicate query is made by the same agent before the time expires, the cached reply is returned.

The agent should examine the values in the reply list and act upon them appropriately. Though not strictly required to do so, the agent is expected to abide by the results of the query.

ACL Check Procedure

Figure 4:
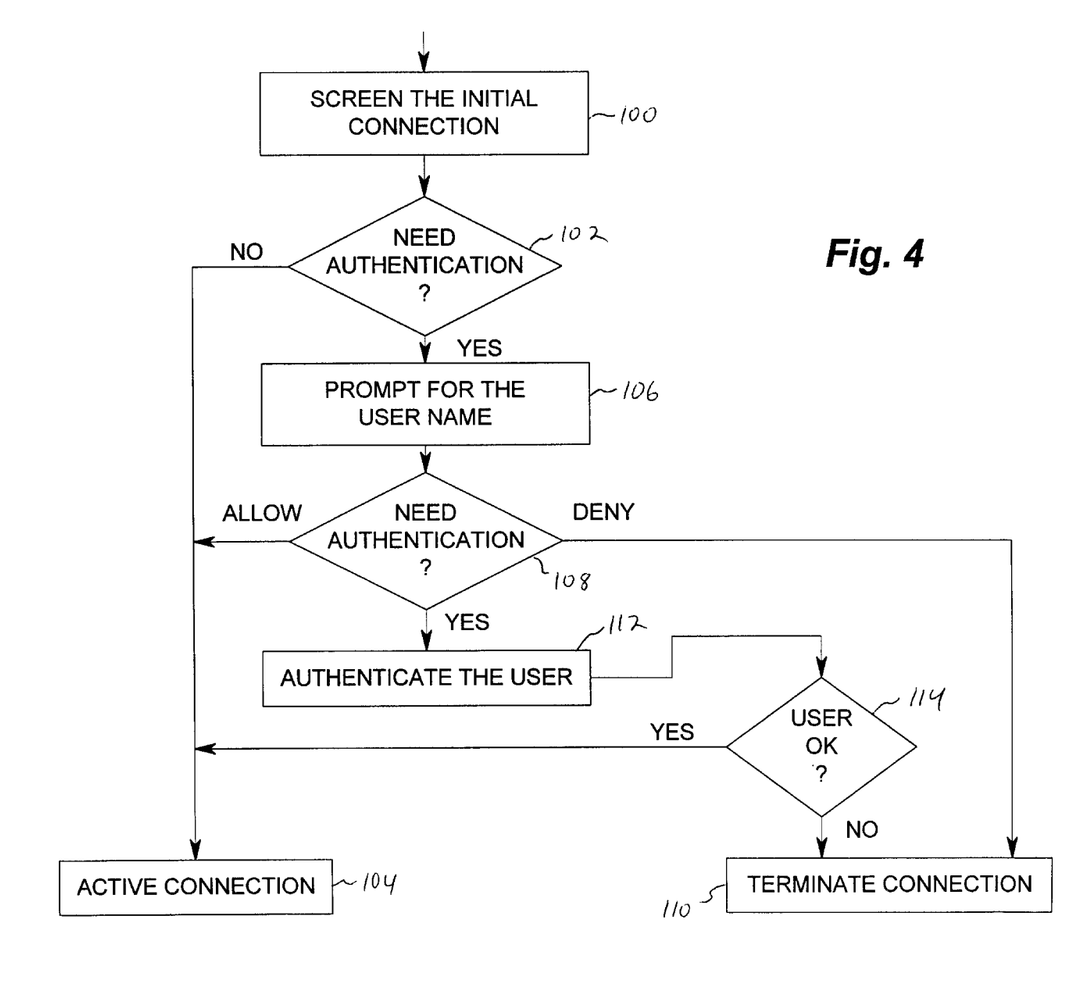
FIG. 4 is a representation of the steps an agent goes through in authenticating a connection.

The steps followed in executing an ACL check are shown in FIG. 4. In FIG. 4, the process starts at 100 where an agent can perform an optional initial ACL check when a connection is first detected. Most agents will perform an initial ACL check when a connection is first detected. The reason is that connections from some hosts are always disallowed. In this case the connection should be rejected with no further ado. For most proxies and servers, Network Services Sentry (NSS) 70 will screen out the initial connection.

Note: If the agent is incapable of doing authentication (e.g., gopher or WAIS), NSS 70 should set the selected warder to "none" before it does the initial check. This avoids a potential ambiguity created by a tentative check on an unknown user name (explained later).

Some agents, such as httpd, listen for connections directly and do not depend on NSS. These agents have to make the initial check themselves.

If the reply to the initial check says "deny" the connection should be closed at that point and no further communication should occur. If the initial check says "allow" the agent can proceed to step 102. As we shall see below, "allow" really means "maybe" until further information about the user is obtained.

If the reply to the initial check says "allow," at 102 the agent should examine the reply to see if it demands authentication of the user. Note that if the agent was screened by NSS 70, the agent will have to issue a duplicate check to get the ACL information because NSS 70 does not pass the ACL information to the agent.

If the ACL reply does not demand authentication, the ACL check procedure is complete and the agent can proceed to 104 to open the connection. Note that some servers, such as ftpd, will always demand authentication anyway.

If, however, the ACL reply demands authentication, the agent should proceed to 106 and prompt for the user name. Note that some services such as gopher and WAIS do not provide a means to ask for a user name. In this case acld would have rejected the connection at the initial ACL check (because NSS 70 set the warder name to "none").

In one embodiment, a "magic window" is opened outside of the regular service to authenticate services like gopher and WAIS. In one such embodiment, a successful authentication will open a timed window to those services to allow access.

The prompt for a user name should include a way to specify the name of the warder. For example:

login: alan
login: alan:securid
login: alan:snk
login: alan:lockout
login: alan:fortezza
login: alan:password Once the agent knows the user name, it should move to 108 and do a second ACL check. The query parameters in the second check should include the same parameters as the first check plus the name of the user. It should also include the name of the selected warder (if the user specified one).

If the reply to the second check says "deny" the agent should move to 110 and drop the connection. The agent may, however, want to first issue a dummy password/challenge prompt to avoid leaking information.

If the reply to the check says "allow," the reply parameters will include a list of allowed warders for that user. The agent should make sure that the user's selected warder is in the list of allowed warders. (If the agent passed the name of the selected warder to acld 60, this test is done automatically by acld 60.)

If the user did not select a warder, the agent should pick the first warder in the list of allowed warders and proceed to 112 to authenticate the user. At this point the agent is done making ACL checks. (In one embodiment, a menu of available warders is displayed for the user and the user selects one of the warders from the list of available warders. In such an embodiment, however, in order to prevent information leakage all warders should be listed, even those that do not actually apply.)

At 112, the agent authenticates the connection with the selected warder. The agent should contact the selected warder and perform the authentication. This may include a challenge/response sequence. Please note that if the user changes his/her login name while talking to the warder, the agent must recheck the ACL with the new user name.

A check of the results of the authentication is made at 114 and, if at 114 the user passes the authentication check, the agent proceeds to 104. If, however, the user fails the authentication check, the agent proceeds to 110 and drops the connection.

Time Intervals

In one embodiment, ACL rules can be configured to specify a time interval. If a connection is active when the time interval expires, acld 60 will notify each agent to reassess the connection. In one embodiment, when a time interval expires each agent receives an asychronous message on the acld socket. The message tells the agent to recheck all of its active connections.

The agent should keep a saved copy of the query list for every active connection. When it receives notification that a time interval has expired, it should reissue ACL checks for all the saved query lists. (The agent does not need to reauthenticate.) If the reply to an ACL check is "deny," the agent should drop the corresponding connection. If the agent wants to be polite, it can send a warning message to the user and provide a grace period, allowing the user to clean up.

A similar asynchronous notification is also sent by acld 60 to all agents whenever the administrator changes the ACL ruleset.

The ACL Rule

Figure 5:
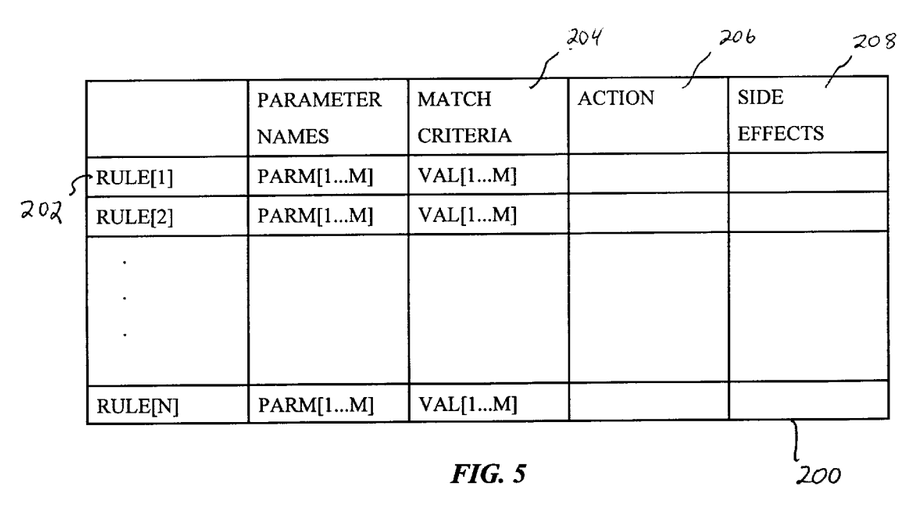
FIG. 5 is a representation of one embodiment of a ruleset which can be used with the access control list daemon of FIG. 3.

The heart of the ACL system is the rule. The ACL database contains a list of rules, called the ruleset. A representative ruleset 200 is shown in FIG. 5, where a rule 202 contains three types of attributes: match criteria 204, the action 206, and side effects 208.

When an agent submits a query list, the parameters in the query list are compared against the match criteria 204 in each rule 202.1 through 202.N. The first rule 202 that matches all of the criteria is returned (except when making a tentative check, which can match more than one rule.)

In one embodiment, the match criteria of a rule is as follows:

1) The source netelement. A netelement is a host name, a subnet name, a domain name, an IP address, or a netgroup name. (A netgroup contains netelements.) If omitted, the source is wildcarded. By using netelements and netgroups, it is possible to name groups of machines symbolically, and also to create groups of groups (i.e., the netgroup).

2) The destination netelement. If omitted, the destination is wildcarded.

3) The source security domain. If omitted, the domain is wildcarded.

4) The destination security domain. If omitted, the domain is wildcarded.

5) A list of agent types: proxy, server, login, and/or NAS.

6) A list of service names. A service name is usually a name found in /etc/services such as "ftp" or "http". For a login agent, the service name can also be one of the following:
   a) console: a login from the system console.
   b) deal: a login from a serial dialup port.
   c) telnet: a login from a telnet connection.

7) The network protocol: either TCP or UDP. The default is TCP.

8) The minimum encryption required. This can be either none or IPSEC. The connection is rejected if the encryption level indicated in the query is not as strong as that of the rule.

9) The name of the usergroup. If omitted, the usergroup is wildcarded.

10) A list of allowed warders. The list of allowed warders is returned to the agent in order to present a menu of choices to the user. If the user specifies a warder, it must match one in this list. Otherwise the connection is rejected.

11) A list of time intervals during which the rule is active.

12) An "ignore" flag. If this flag is set, the rule is ignored. This can be used to temporarily disable a rule without deleting it.

Other embodiments include subsets of the above match criteria. In one embodiment, it is possible to assign a collection of users, hosts or services to a symbolic name. This is demonstrated above for groups of machines and for groups of users but also could be used to represent services. By doing this one could arrive at a single ACL rule 202 covering the majority of users, services and machines. For instance, a single rule 202 may have services=Standard_services and users=Internet_users. To enable service for a new employee Joe Smith, his name would simply be added to the list of users in the Internet_users group; a new rule 202 would not be necessary.

The most important attribute of a rule is the action. In one embodiment, each action can assume one of two values: allow or deny. Allow means to accept the incoming connection. Deny means to reject the incoming connection.

In another embodiment, each action can assume one of three values: allow, deny or default. In this embodiment default is a special action that provides the ability to specify common side effects for multiple rules; on receiving a query acld 60 collects all the side effects from the matching default rules and merges them with the final allow or deny rule. Merging happens in sequential order of the rules, with the side effects of the final rule overriding the side effects of the default rule(s).

The side effects of a reply can change the behavior of the agent in some way. For instance, the reply can demand authentication. Each reply contains a flag indicating if authentication is needed. If set, the agent must authenticate the user. It must prompt for a user name, then select a warder, and then contact the selected warder.

If authentication is needed, the reply includes a list of allowed warders. The list of allowed warders allows the agent to present a menu of choices to the user. If the user specifies a warder, the agent must verify that it matches one of the choices in this list.

The reply can tell the agent to redirect the destination IP address to a different machine. This is only applicable to proxies 50.

The reply can tell the agent to redirect the destination port number to a different port. This is only applicable to proxies 50.

The reply can provide additional side effects that are unique to the service. These are called service parameters. For example, for FTP the service parameters indicate whether GET or PUT operations are allowed. For HTTP the service parameters indicate the types of URLs that are blocked.

As noted previously, in one embodiment the ACL is implemented in a relational database. Such an implementation carries the advantage that the ACL is extensible; new parameters can be defined without redoing the entire ruleset.

To help give you a better understanding of how ACL checks work, this section presents several examples. Let's start with a simple example, a ruleset that contains only one rule:

| Name: | telnet_out |
|---|---|
| Position: | 1 |
| Action: | allow |
| Ignore: | no |
| Source: | * |
| Dest: | * |
| Source Sec Domain: | internal |
| Dest Sec Domain: | external |
| Agents: | [proxy] |
| Services: | [telnet] |
| Protocol: | tcp |
| Usergroup: | * |
| Time Intervals: | [] |
| Redir Host: | |
| Redir Port: | |
| Auth Needed: | no |
| Min Encrypt: | none |
| Alert: | none |
| Allowed Auth Methods: | [] |
| Service Parameters: | {} |
| Comments: | "" |

The rule allows any client located in the internal security domain to connect to any telnet server located in the external security domain. No authentication is required.

Here is a ruleset with two rules:

| Name: | ftp_out | ftp-in |
|---|---|---|
| Position: | 1 | 2 |
| Action: | allow | allow |
| ignore: | no | no |
| Source: | * | * |
| Dest: | * | local |
| source Sec Domain: | internal | external |
| Dest Sec Domain: | external | external |
| Agents: | [proxy] | [server] |
| Services: | [ftp] | [ftp] |
| Protocol: | tcp | tcp |
| usergroup: | * | Anonymous |
| Time Intervals: | [] | ["Sat-sun", "Mon mid-8am", "Mon-Fri 5pm-mid"] |
| Redir Host: | | |
| Redir Port: | | |
| Auth Needed: | no | yes |
| Min Encrypt: | none | none |
| Alert: | none | none |
| Allowed Auth Methods: | [] | [pas] |
| Service Parameters: | {} | {ftp:[get]} |
| Comments: | | 'anonymous FTP is allowed outside of business hours' |

The first rule (ftp_out) allows any client in the internal security domain to access any FTP server in the external domain. The second rule supports an anonymous FTP server on the local firewall (local always refers to the local firewall regardless of the security domain). Access to the server is limited to outside of business hours and only GET is allowed.

Here is a ruleset for an organization with a traveling sales force. Some salespersons have laptops with IP encryption software.

| Name: | out | sales-crypt | sales-nocrypt |
|---|---|---|---|
| Position: | 1 | 2 | 3 |
| Action: | allow | allow | allow |
| Ignore: | no | no | no |
| Source: | * | * | * |
| Dest: | * | * | * |
| Source Sec Domain: | internal | external | external |
| Dest Sec Domain: | external | internal | internal |
| Agents: | [proxy] | [proxy] | [proxy] |
| Services: | [telnet, ftp] | [telnet, ftp] | [telnet, ftp] |
| Protocol: | tcp | tcp | tcp |
| Usergroup: | * | Sales | Sales |
| Time Intervals: | [] | [] | [] |
| Redir Host: | | | |
| Redir Port: | | | |
| Auth Needed: | no | yes | yes |
| Min Encrypt: | none | ipsec | none |
| Alert: | none | none | none |
| Allowed Auth | [] | [passwd,securid] | [securid] |

-continued

| Methods: | | | |
|---|---|---|---|
| Service Parameters: | {} | {ftp: [get,put]} | {ftp: [get,put]} |
| Comments: | | "encryption plain pas ok" | "no encryption strong auth required" |

Weaker authentication is permitted if IP encryption is used, because the plain passwords (pas) cannot be observed by packet sniffers.

Below is an example of why some ACL checks cannot be fully resolved until the user name is known.

| Name: | Other | Sales | Eng |
|---|---|---|---|
| Position: | 1 | 2 | 3 |
| Action: | deny | allow | allow |
| ignore: | no | no | no |
| Source: | * | * | * |
| Dest: | domain sctc.com | domain sctc.com | domain sctc.com |
| Source Sec Domain: | external | external | external |
| Dest Sec Domain: | internal | internal | internal |
| Agents: | [proxy,nas] | [proxy, nas] | [proxy,nas] |
| Services: | [telnet,ftp] | [telnet,ftp] | [telnet,ftp] |
| Protocol: | tcp | tcp | tcp |
| Usergroup: | Other | Sales | Eng |
| Time Intervals: | [] | [] | [] |
| Redir Host: | | | |
| Redir Port; | | | |
| Auth Needed: | n/a | yes | yes |
| Min Encrypt: | n/a | none | none |
| Alert: | n/a | none | none |
| Allowed Auth Methods: | n/a | [securid] | [lockout] |
| Service Parameters: | n/a | {ftp: [get]} | {ftp: [get]} |
| Comments: | "Deny users\ in the Other\ category' | "sales" | "engineers" |

When the initial ACL check is made at 102, the name of the user is not yet known. Therefore all three rules can potentially match. In a situation like this acld 60 performs a tentative check. A tentative check will return "allow" if there exists at least one rule that might allow the connection, unless a deny rule exists that will certainly reject the connection. (For example if the first rule had a wildcard for the usergroup instead of Other, acld 60 would reject the connection outright.)

A tentative check can match more than one "allow" rule. When this happens, acld 60 will merge all of the allowed warders together. For the above example it will return the following side effects:

| Auth Needed: | yes | |
|---|---|---|
| Allowed Auth Method: | [securid, lockout] | Both |

Both SecurID and LOCKout are returned as allowed warders. In general, acld 60 will return the union of all allowed warders for all tentatively matching rules. In the embodiment shown the default warder is SecurID because Sales comes before Eng.

When the agent makes its second check at 108 including the user name, it will match exactly one rule and will return only the one warder name. This is called a final check. Knowledge of the user name is crucial to selecting the final rule. If the agent is incapable of doing authentication (e.g, gopher or WAIS), it should set the selected warder to "none". The warder named "none" is special because it forces acld 60 to do a final check instead of a tentative check.

In summary, there are two ways to force acld 60 to do a final check:

1. Specify the user name in the query list; or
2. Set the selected warder to "none" in the query list.

Otherwise acld 60 will do a tentative check and may match more than one rule. The agent is responsible for doing a final check on the connection once the user name is known. Failing to do a final check is a serious error.

In one embodiment ruleset 200 includes a URL filter parameter. One of the values included in an ACL query could then be the URL that the user is trying to access. Ruleset 200 would then include entries for particular URLs or groups of URLs that have been banned or restricted. In one embodiment, a rating service such as WebTrack™, available from Webster Network Strategies™ could be used to filter URLs. In WebTrack™, URLs are grouped into categories based on hate speech, sexually explicit material, etc. The ACL ruleset could then be used to restrict or ban access to categories of URLs.

To summarize, during the life of a TCP connection, the ACL database should be queried at four different times:

1) by nss 70 when the TCP connection is first attempted. The name of the user is unknown at this point so acld 60 makes a 'tentative check'. A tentative check will succeed if an allow rule is found that accepts at least one user given the src, dest, service, etc. It will fail if a deny rute is found with a wildcard usergroup.

2) by the agent (proxy 50, server 52 or login agent 54) if it must know whether or not to prompt for a user name. Some proxies will always prompt for a user name and therefore will not need to make this check.

3) by the agent after it gets the user name and (optionally) the name of the warder. At this point the agent has all of the information necessary to perform a final check. As a side effect, acld 60 will return a list of allowed warders, the first of which is the default warder. The agent should verify that the selected warder is in the list of allowed warders. The agent can then do authentication with the selected warder. Note that the list can be empty, which means that no authentication is required.

4) by the agent when acld 60 sends an async notification that indicates that ACL ruleset 200 was changed by the administrator. The agent should recheck all of its active connections. A notification is also sent whenever a time-based rule crosses a time boundary.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of regulating the flow of internetwork connections through a firewall having a network protocol stack, wherein the network protocol stack includes an Internet Protocol (IP) layer, the method comprising the steps of:

determining parameters characteristic of a connection request, wherein the parameters include a netelement parameter characteristic of where the connection request came from;

generating a query, wherein the step of generating a query includes the step of adding the parameters to a query list;

determining if there is a rule corresponding to the query;

if there is a rule, determining if authentication is required by the rule;

if authentication is required by the rule, executing an authentication protocol; and activating the connection if the authentication protocol is completed successfully.

2. The method according to claim 1 wherein the step of executing an authentication protocol includes the step of calling a warder.

3. The method according to claim 1 wherein the step of determining if there is a rule corresponding to the query includes the step of accessing a relational database with the query.

4. The method according to claim 1 wherein the netelement parameter identifies a group of host names.

5. The method according to claim 1 wherein the netelement parameter identifies a group of IP addresses.

6. The method according to claim 1 wherein the netelement parameter identifies a group of subnets.

7. The method according to claim 1 wherein the netelement parameter identifies a group of netgroups, wherein a netgroup is a collection of netelements.

8. The method according to claim 1 wherein the netelement parameter identifies a group of DNS domains.

9. A method of regulating the flow of internetwork connections through a firewall having a network protocol stack, wherein the network protocol stack includes an Internet Protocol (IP) layer, the method comprising the steps of:

forming an access control list, wherein the access control list includes a plurality of rules, wherein each rule includes a plurality of rule parameters and values associated with said rule parameters;

determining query parameters characteristic of a connection request, wherein said query parameters include a netelement parameter characteristic of where the connection request came from;

generating a query, wherein the step of generating a query includes the step of adding the query parameters to a query list;

applying the query to the access control list, wherein the step of applying includes the step of determining if there is a rule corresponding to the query;

if there is a rule, determining if authentication is required by the rule;

if authentication is required by the rule, executing an authentication protocol; and activating the connection is the authentication protocol is completed successfully.

10. The method according to claim 9, wherein the method further comprises the steps of:

monitoring time of day; and closing connections at predefined times of the day.

11. The method according to claim 9, wherein the query parameters include a URL parameter.

12. A firewall, comprising:

a first communications interface;

a second communications interface;

a first network protocol stack connected to the first communications interface, wherein the first network protocol stack includes an Internet Protocol (IP) layer and a transport layer;

a second network protocol stack connected to the second communications interface, wherein the second network protocol stack includes an Internet Protocol (IP) layer and a transport layer, wherein communication between the first and second communications interfaces passes through a proxy operably coupled to the protocol stacks and communication is otherwise restricted between the protocol stacks;

an access control list process, wherein the access control list process accesses a plurality of rules implementing a security policy; and an agent, connected to the access control list process and to the transport layers of said first and second network protocol stacks, wherein the agent receives messages from the transport layer, sends the access control list process a query based on parameters associated with the message and executes an authentication protocol selected by the access control list process as a result of the query.

13. The firewall according to claim 12 wherein the first network protocol stack and the first communications interface are assigned to a first burb and the second network protocol stack and the second communications interface are assigned to a second burb.

14. The firewall according to claim 13 wherein the query includes a burb symbol identifying the first burb and wherein the authentication protocol selected by the access control list process varies as a function of the burb symbol.

15. The firewall according to claim 12 wherein the query includes a sender symbol identifying the sender of the message and wherein the authentication protocol selected by the access control list process varies as a function of the sender symbol.

16. The firewall according to claim 12 wherein the first network protocol stack includes a decryption process, operating at the IP layer, that decrypts encrypted messages received by said first communications interface and forwards the decrypted message to the agent via the transport layer.

17. The firewall according to claim 12 wherein the authentication protocol selected by the access control list process varies as a function of whether a message was encrypted or not when received by the IP layer.

18. A computer program product, comprising:

a computer usable medium having computer readable program code embodied thereon, the computer readable program code, when executed, implementing on the computer a method of regulating the flow of internetwork connections through a firewall having a network protocol stack, wherein the network protocol stack includes an Internet Protocol (IP) layer, the method comprising the steps of:

determining parameters characteristic of a connection request, wherein the parameters include a netelement parameter characteristic of where the connection request came from;

generating a query, wherein the step of generating a query includes the step of adding the parameters to a query list;

determining if there is a rule corresponding to the query;

if there is a rule, determining if authentication is required by the rule;

if authentication is required by the rule, executing an authentication protocol; and activating the connection if the authentication protocol is completed successfully.

19. The computer program product according to claim 18, wherein the step of executing an authentication protocol includes the step of calling a warder.

* * * * *